(12) United States Patent
Khoo et al.

(10) Patent No.: US 9,134,774 B2
(45) Date of Patent: Sep. 15, 2015

(54) SHARING POWER BETWEEN NETWORK DEVICES

(75) Inventors: Keng Kok Khoo, Singapore (SG); Kum Cheong Adam Chan, Singapore (SG); Tze Yen Loh, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 811 days.

(21) Appl. No.: 13/458,869

(22) Filed: Apr. 27, 2012

(65) Prior Publication Data

US 2013/0290739 A1 Oct. 31, 2013

(51) Int. Cl.
*H01R 11/00* (2006.01)
*G06F 1/18* (2006.01)

(52) U.S. Cl.
CPC .................. *G06F 1/189* (2013.01)

(58) Field of Classification Search
CPC ............... H01R 31/06; G06F 1/189
USPC .................................... 439/502, 638
See application file for complete search history.

(56) References Cited

U.S. PATENT DOCUMENTS

| | | | |
|---|---|---|---|
| 6,153,946 A * | 11/2000 | Koch et al. | 307/64 |
| 6,608,264 B1 | 8/2003 | Fouladpour | |
| 7,416,440 B2 * | 8/2008 | Homyk et al. | 439/502 |
| 7,474,704 B2 | 1/2009 | Lum et al. | |
| 7,591,673 B2 * | 9/2009 | Chan et al. | 439/502 |
| 7,982,336 B2 | 7/2011 | Hiscock et al. | |
| 8,235,746 B2 * | 8/2012 | He | 439/502 |
| 2009/0113101 A1 * | 4/2009 | Liu et al. | 710/300 |

OTHER PUBLICATIONS

P564-001 1-ft. DVI-D Y Splitter Cable (DVI-D M/2xF), Download Date: Apr. 27, 2012. <http://www.tripplite.com/en/products/model.cfm?txtModelID=3635>.
Passive PoE Cable Set, Download Date: Apr. 27, 2012. <http://www.sparkfun.com/products/10759>.
SummitStack Stacking Technology, Extreme Networks Technical Brief, 2010. <http://www.extremenetworks.com/libraries/techbriefs/TBSummitStack_1346.pdf>.

* cited by examiner

*Primary Examiner* — Tho D Ta
(74) *Attorney, Agent, or Firm* — Hewlett-Packard Patent Department

(57) ABSTRACT

Power is shared between network devices through a power cable having a first connector at a first end thereof and a second connector at a second end thereof. The first connector comprises a first connection portion for connection with a power sharing connector of a network device and a second connection portion for connection with a connector of another power cable. The second connector comprises a first connection portion for connection with a power sharing connector of a network device and a second connection portion for connection with a connector of another power cable.

12 Claims, 5 Drawing Sheets

SHARING POWER BETWEEN NETWORK DEVICES

BACKGROUND

Power requirements for stackable network devices, such as switches and routers etc, may vary depending upon the amount of switching and other processing carried out by the network device. Furthermore, in some cases, the network device may additionally need to supply power through PoE (Power over Ethernet) ports.

Traditionally each network device in a stack would have its own integral power supply to supply power for that network device alone. However, more recently technology has been developed to allow power to be shared with other network devices in a stack. Typically each network device has its own power supply, the network devices in the stack are connected together, and one of the network devices is designated as a master device which coordinates sharing of power between the network devices. In this way power can be temporarily re-directed to a network device which is in need of more power for whatever reason. However, the wiring arrangements facilitating power sharing can be fiddly and awkward to modify.

BRIEF DESCRIPTION OF THE DRAWINGS

Examples will now be described, by way of non-limiting example only, with reference to the accompanying drawings, in which.

DETAILED DESCRIPTION

Figure 1:
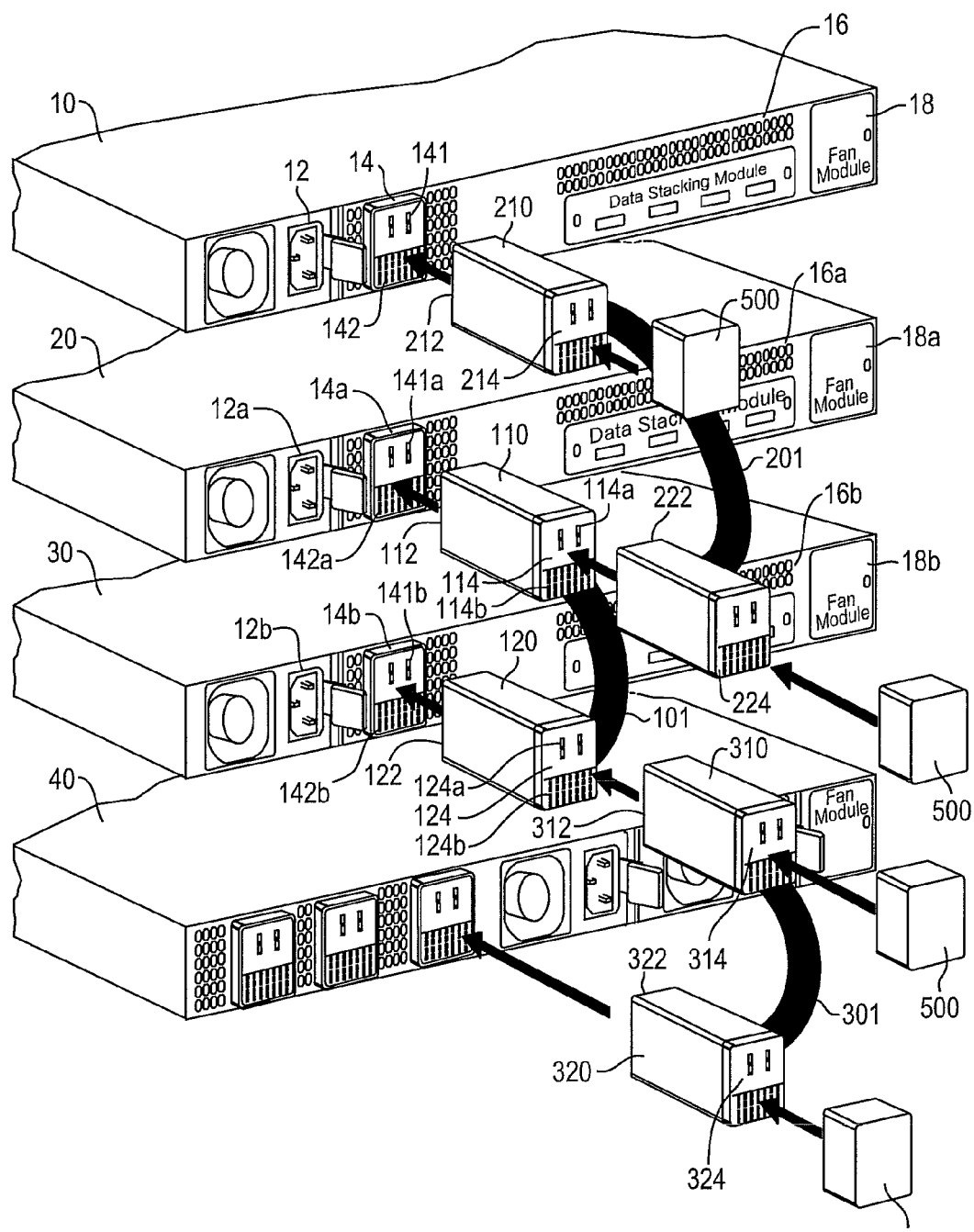
FIG. 1 shows a stack of network devices connected by power sharing cables.

FIG. 1 shows a stack of network devices and power cables for power sharing in the stack of network devices. The network devices may for instance be switches, routers, servers etc. A 'stack' of network devices refers to a set of network devices which have been grouped together. For example, they may be rack mounted one on top of the other. In accordance with the present disclosure the network devices in a stack share electrical power with each other.

In some, but not all, cases the network devices in stack may in addition be configured so that they can be managed together as if they were a single network device, for instance by providing a single IP address for remote management of the devices. In some, but not all, cases the network devices in a stack may configured to act as a single network device when interacting with other devices in the network (for instance by presenting a single MAC address to other devices in the network).

In the example of FIG. 1, a first network device 10 has a power connector 12 for receiving a power cable from a mains (AC) power source, a power sharing connector 14, a data stacking module 16 and a fan module 18. The power connector 12 is connected to an internal power supply unit of the network device. The internal power supply unit may convert mains AC voltage (for instance 120V or 230V) to appropriate DC voltage for use by various components of the network device and supply power to those various components.

The power sharing connector 14 is connected to the internal power supply unit. It allows power to be received from other network devices in the stack and allows the network device to send power to other network devices in the stack. The power sharing connector 14 may be a socket or a plug depending on the design of the network device. The power sharing connector 14 may be adapted to send and receive DC power and may be adapted for a particular voltage which may be different to the mains outlet voltage. In one example, the power sharing connector operates at 54V DC.

The data stacking module 16 facilitates communication of network data packets between the network devices in stack. The fan module 18 comprises a fan for ventilation and cooling purposes.

Second network device 20 and third network device 30 also have their own power sockets 12*a*, 12*b*, power sharing connectors 14*a*, 14*b*, data stacking modules 16*a*, 16*b* and fan modules 18*a*, 18*b*. While in this example there are three network devices in the stack, there may be more or fewer network devices in other examples (for instance only two, or more than three).

In some cases the stack may have an External Power Supply unit (EPS) 40 which has an internal power supply unit, a socket for receiving power from an external source (such as AC mains power) and power sharing connectors for providing power to network devices in the stack. The purpose of the EPS is to provide further power, beyond that which is available from the power supply units of the network devices themselves. While an EPS is shown in the example of FIG. 1, it should be noted that a network device stack need not have an EPS and in many cases the EPS will be absent.

In general each network device will have its own internal power supply unit, but in principle it would be possible for a network device not to have its own internal power supply unit, but instead draw all its power from another network device in the stack, or an External Power Supply unit (EPS), via its power sharing connector.

One of the network devices may be designated as a 'master' and manage distribution of power between the network devices in the stack. For example, the master device may treat the power available from all the power supply units in the stack as a single pool and allocate a certain amount of power to each network device based on the reported or assumed needs of each network device. In other cases a similar result may be achieved by a distributed arrangement in which each device uses power allocation decision logic to formulate a mutually agreed-upon power allocation. Management of the distribution of power may involve sending communication signals between the network devices with information such as the power requirements of a network device, any changes in the power requirement and in some cases instructions for sharing power; in this disclosure such signals are referred to as communication signals relating to power sharing.

The power sharing connectors 14, 14*a*, 14*b* are connected by power sharing cables in order to share electrical power between the network devices.

Figure 2:
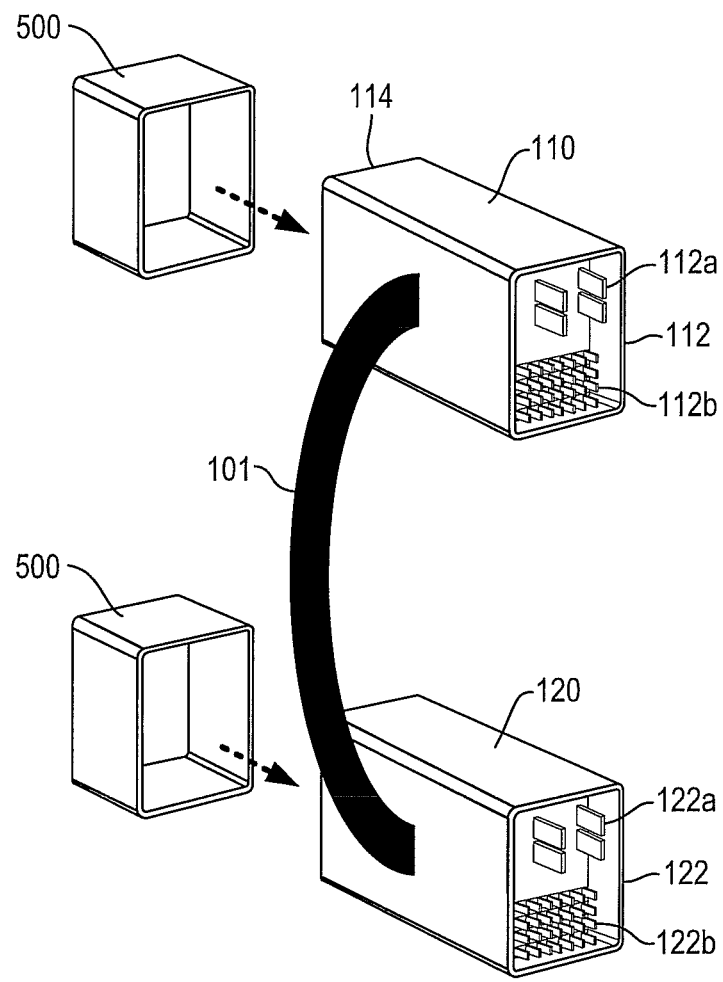
FIG. 2 shows a power sharing cable.

An example of a power sharing cable 100 is shown in FIG. 1 and FIG. 2. The power sharing cable has a first connector 110 and a second connector 120 at either end of an electric cable 101 for conducting electrical power. The first connector has a first connection portion 112 (which in this example is a plug) and a second connection portion 114 (which in this example is a socket). The first connection portion 112 can be seen in FIG. 2, while the second connection portion 114 is best seen in FIG. 1. The second connector likewise has a first connection portion 122 and a second connection portion 124.

The first connection portion 112 is adapted for connection with a power sharing connector 14 of a network device, while the second connection portion is adapted for connection with a first connection portion of a connector of another power cable of a similar type. This enables the power sharing cables to be 'daisy-chained' together, as will be described below.

In the example of FIG. 1, the connector is in the form of a single piece which has a male plug at one end thereof and a female socket at the opposite end thereof. The power sharing cable 100 may be thought of as a '4-way' device as in this example it has two male plugs and two female sockets.

In addition to conducting electrical power, the power sharing cable and its connectors may communicate signals relating to the power sharing (e.g. instructions for sharing power or information relating to the power requirements of a network device).

Looking at the connector 110 in more detail, in the example of FIG. 1 the first connection portion 112 has a plurality of pins 112a for conveying electrical power and a plurality of pins 112b for conveying communication signals relating to sharing of power. The first connection portion 122 of the second connector likewise has a plurality of power and communication pins 122a, 122b. The power sharing connectors 14, 14a, 14b of the network devices and the second connection portions 114, 124 of the power cable connectors have corresponding apertures 141, 142, 141a, 142a, 141b, 142b, 114a, 114b, 124a, 124b etc for receiving and electrically connecting with these pins. In some cases the connector may have a hardware logic module (such as a PCB, or possibly an ASIC or processor for executing machine readable instructions) for managing communication signals relating to power sharing. The logic module typically has the necessary logic for transmitting and formatting signals and does so in response to instructions sent by a power sharing controller internal to the network device to which it is connected. In the present example, and the examples described below, the power sharing connector of the network device is a socket. Therefore the first connection portions of the first and second connectors of the power sharing cable are plugs suitable for insertion into the power sharing socket of the network device. Therefore, for simplicity, in the description below, the first connection portions are referred to as plugs and the second connection portions as sockets. However, it would be possible for the network device instead to have a power sharing plug for insertion into a socket of a connector of a power cable; in which case the first connection portions would be sockets and the second connection portions would be plugs.

FIG. 1 shows one arrangement in which the various network devices may be connected together for power sharing. The plug 112 of the first connector 110 of a first power sharing cable is to be inserted or plugged into the power sharing socket 14a of the second network device. The plug 122 of the second connector 120 is to be plugged into the power sharing socket 14b of the third network device.

A second power sharing cable is the same as the first power sharing cable and has a third connector 210 and a fourth connector 220 linked by a power cable 201. A plug 212 of the third connector is inserted into the power sharing socket 14 of the first network device, while the plug 214 of the fourth connector 220 is inserted into the socket 114 of the first connector 110. Power can thus be shared between first, second and third network devices via their respective power sharing sockets and the power sharing cables.

An EPS 40 may be used, in which case its power sharing sockets can likewise be connected by power sharing cables to power sharing sockets of the network devices or to a socket of a connector belonging to another power sharing cable. In the illustrated example, a power sharing cable 301 having connectors 310, 320 at either end may be used.

The power sharing arrangement is easy to assemble because the power sharing cables can be daisy chained together by inserting the plug of a connector of a first power sharing cable into the socket of a connector of a second power sharing cable. Due to this daisy chaining, it is not necessary for a network device to have a plurality of power sharing sockets in order to connect to more than one other network device. The daisy chaining may also help provide a neater arrangement and avoid overlapping cables which can get tangled.

Furthermore, by daisy chaining, it is simple to add another network device to the stack without disrupting the existing power sharing cables. For example an extra network device could be added on top of the first network device. The extra network device could be added to the power sharing arrangement by connecting a power sharing cable (of the type described above) to the socket 214 of the third connector 210 and to a power sharing socket of the extra network device. In this way the existing stack power cabling need be removed or re-plugged and so there is no downtime.

Caps 500 may be provided to seal of any sockets which are not currently in use. This helps to prevent contamination of the electrical contacts and also protects users from possible electric shock. For instance the socket 214 of first connector 210 of power sharing cable 200 may be capped. The caps may be made of an insulating material and may have a lid shape which fits over the outer walls of the connector.

Figure 3A:
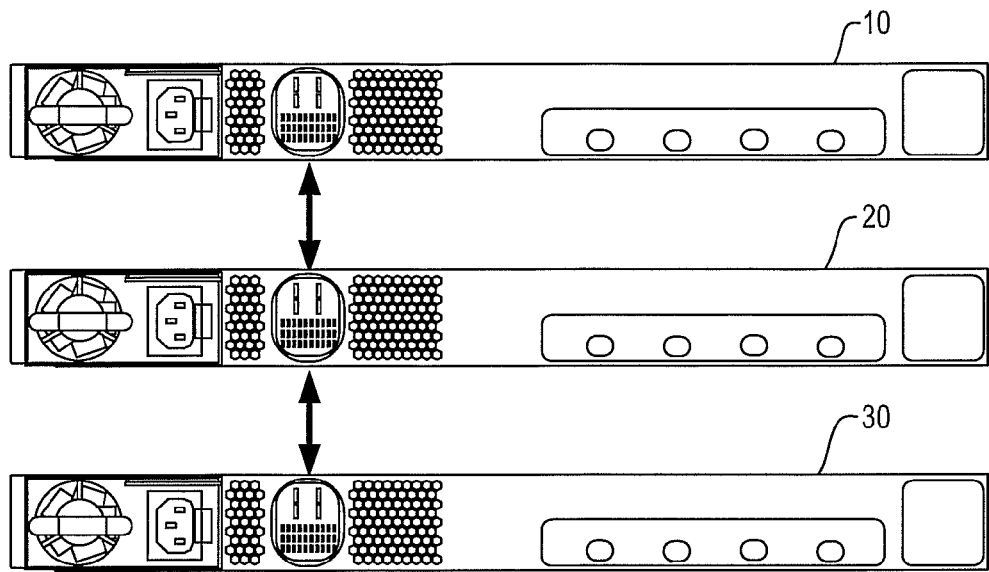
FIGS. 3(*a*), (*b*) and (*c*) show various configurations for power sharing cables in a stack of network devices.
Figure 3B:
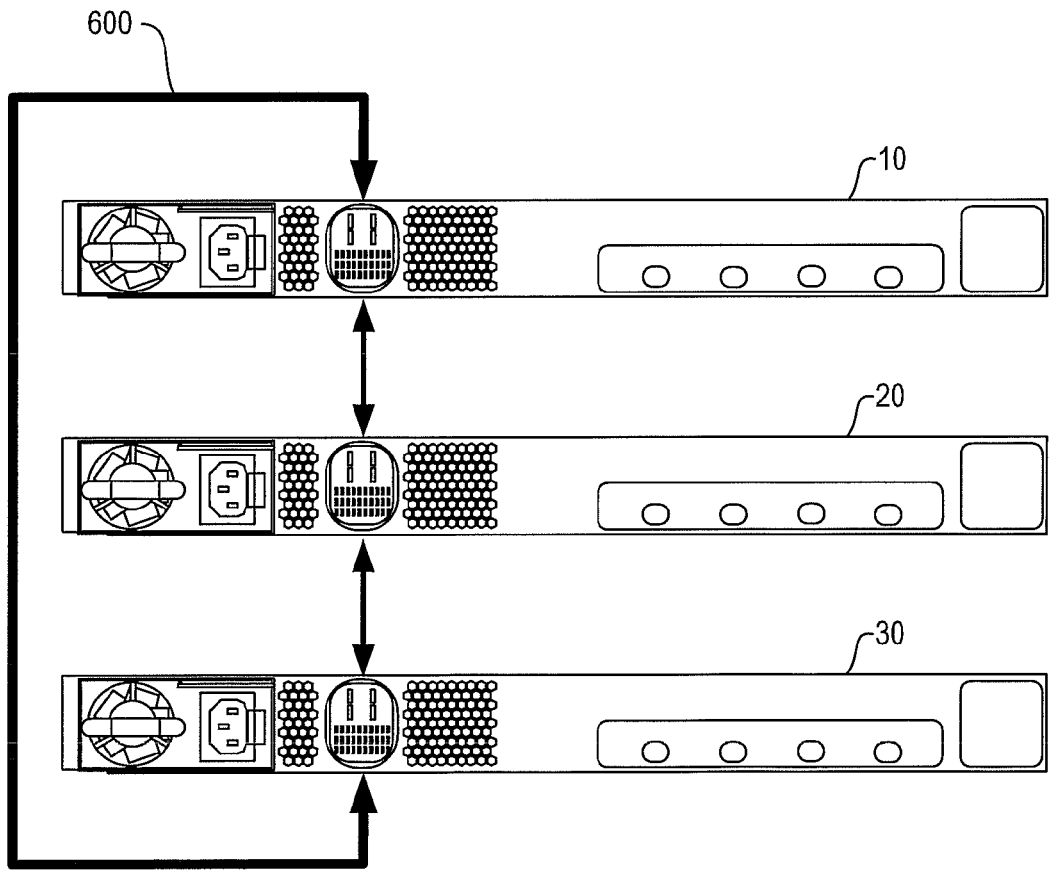
Figure 3C:
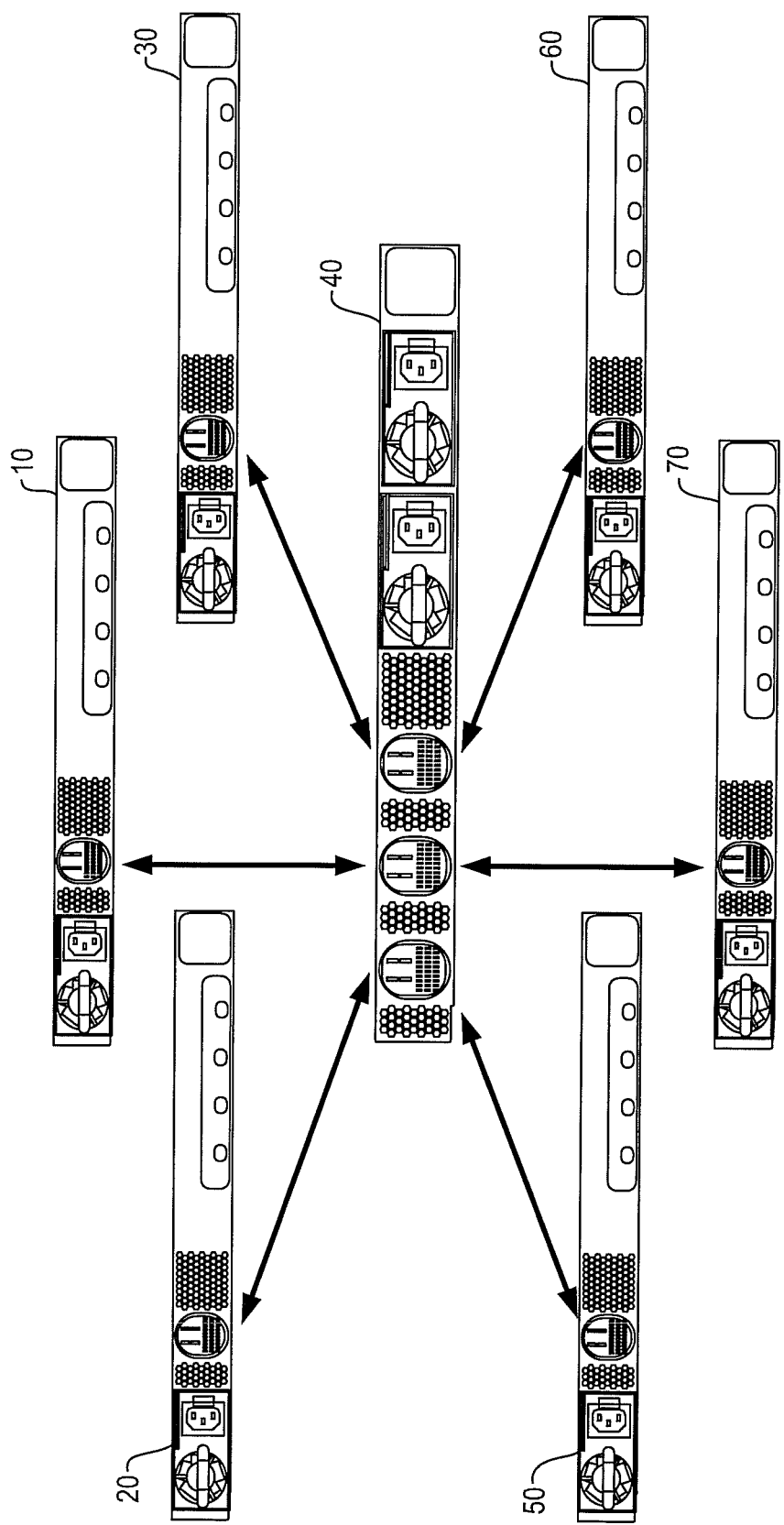

The network devices in the stack may be connected in various different possible power sharing configurations. FIG. 3(a) shows a chain configuration in which power sharing cables connect the network devices in a basic chain configuration which has two ends. FIG. 3(b) shows a ring configuration which is similar to the chain configuration but has redundancy (i.e. can withstand failure of one network device), as a longer power sharing cable 600 is used to connect the devices at either end of the chain to form a ring. Note that the longer power sharing cable 600 may itself be made up of several daisy chained power sharing cables (several of the cables shown in FIG. 2 may be joined together). This means that it is not necessary to have on hand various cables of different lengths and that a new longer cable does not have to be ordered to accommodate adding a new device to the stack. FIG. 3(c) shows a star configuration in which each network device is connected to a central network device, which may for example be an EPS or the master network device. In the illustrated example each power sharing connector of the central network device is connected to two other network devices by 'daisy chaining' power cables with connectors of the type described with reference to FIG. 2.

Figure 4:
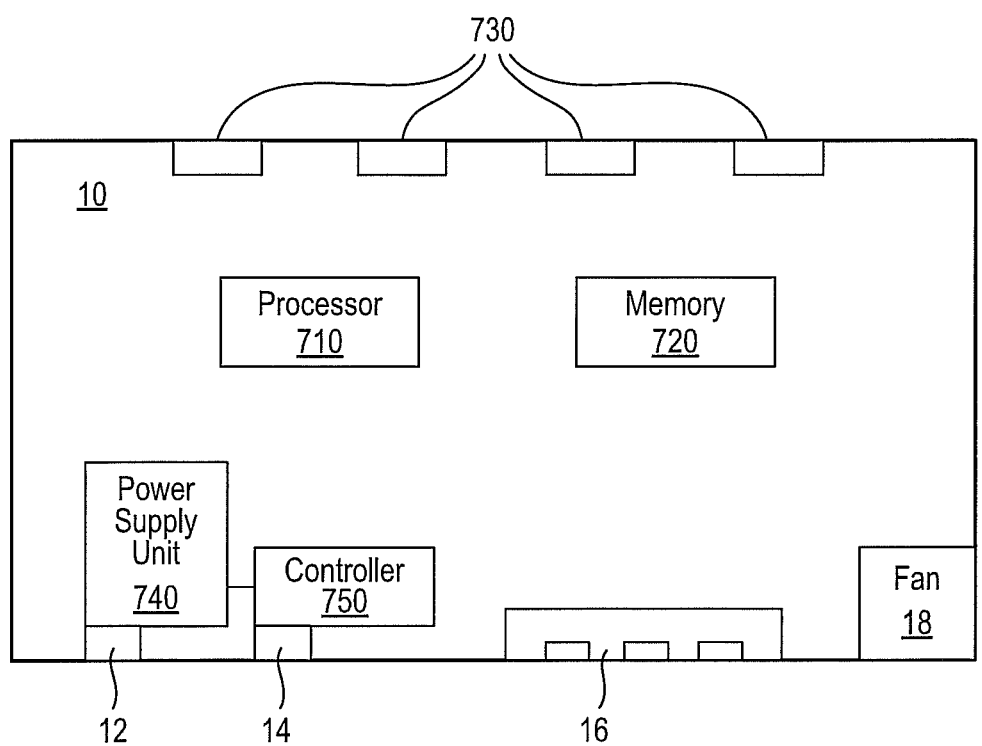
FIG. 4 shows an example structure of a network device capable of power sharing.

FIG. 4 is a schematic diagram of a network device according to the present disclosure. The network device has a processor 710 and a memory 720 which may implement various functions, such as a module for routing or switching of data packets, network protocols etc. The network device also has a plurality of data ports such as Ethernet ports 730. In addition the network device has a fan module 18, a power supply unit 740, a power supply connector 12 for connecting the power supply unit to an external source of power, a data sharing module 16 with ports of data sharing between network devices in the stack, and a single power sharing connector 14. The network device may also have a controller 750 for controlling power sharing amongst network devices in the stack. While the controller 750 is shown as a separate hardware module in FIG. 4, it may be implemented as software held in memory 720 and executed by processor 710. Further, while shown separately in FIG. 4, the memory and processor may be integrated as a single chip, such as a switching ASIC.

In the example of FIG. 4, the network device has only a single power sharing connector for sharing power with other network devices in a stack. As the power sharing cable of the type disclosed in the present disclosure can be daisy chained, this makes it possible for the network device to have only a single power sharing connector, thus saving space at the back of the network device and leaving more room for other interfaces. However, the power sharing cable may also be used with network devices having more than one power sharing socket. Thus, in other examples in accordance with the present disclosure, the network device may have more than one power sharing connector.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features

What is claimed is:

1. A power sharing cable for sharing power between network devices, the power sharing cable comprising:
    an electric cable for conveying electrical power, the electric cable having a first connector at a first end and a second connector at a second end;
    the first connector comprising a first connection portion for connection with a network device and a second connection portion for receiving a connector of another power sharing cable;
    the second connector comprising a first connection portion for connection with another network device and a second connection portion for receiving a connector of yet another power sharing cable,
    wherein the second connection portion of the first connector is capable of receiving the first connection portion of the second connector, and the second connection portion of the second connector is capable of receiving the first connection portion of the first connector.

2. The power sharing cable of claim 1 wherein the power cable is capable of conveying both power and communication signals from the first connector to the second connector.

3. The power sharing cable of claim 1 wherein the first connector has separate power and communication pins for insertion into a socket, the second connector has separate power and communication pins for insertion into a socket and the electrical cable has separate lines for conveying power and signals.

4. The power sharing cable of claim 1 wherein a cap is placeable over the second connection portion of said first connector.

5. The power sharing cable of claim 1 wherein said first connector comprises an elongate member having a male plug at a first end thereof and a female socket at an opposite end thereof.

6. A stack of network devices comprising at least three network devices arranged in a stack, one of said at least three network devices having a controller for managing sharing of power between the at least three network devices; each of said at least three network devices having a power sharing socket for sharing power with other network devices in the stack;
    a first power cable having a first connector and a second connector, a plug or socket of the first connector being plugged into a power sharing plug or socket of one of the at least three network devices and a plug or socket of the second connector being plugged into a power sharing plug or socket of another of the at least three network devices;
    a second power cable having a third connector and a fourth connector; a plug or socket of the third connector being plugged into a plug or socket of either the first or second connector of the first power cable; a plug or socket of the fourth connector being plugged into a power sharing plug or socket of a network device which is not directly connected to the first power cable.

7. The stack of network devices of claim 6 wherein each network device has only a single power sharing connector, said single power sharing connector being either a plug or a socket.

8. The stack of network devices of claim 6 wherein the stack is extendable to share power with a newly added network device by using a further power sharing cable, without unplugging power cables which are already plugged into one of said network devices.

9. The stack of network devices of claim 6 wherein the stack is extendable to share power with a newly added network device, by using a third power cable having fifth and sixth connectors and plugging a plug or socket of the fifth connector into a power sharing plug or socket of the newly added network device and plugging a plug or socket of the sixth connector into a plug or socket of a connector belonging to the first or second power cable.

10. A network device comprising a memory, a processor, a data port to communicate data with a network, a power supply unit to supply DC power to components of the network device, a power socket to receive AC power from an external source and supply said AC power to said power supply unit, a controller to control sharing of power with other network devices in a stack, and a single power sharing connector for receiving a power sharing cable to send DC power to, or receive DC power from, other network devices in a stack; and
    a power sharing cable connectable to the network device, wherein the power sharing cable comprises a first connector at a first end and a second connector at a second end;
    the first connector comprising a first connection portion for connection with the single power sharing connector of the network device and a second connection portion for connection with another power sharing cable; and
    the second connector comprising a first connection portion for connection with a power sharing connector of another network device and a female socket for receiving a male plug.

11. A power cable for sharing power between network devices, the power cable comprising an electric cable having a first connector at a first end and a second connector at a second end;
    the electric cable being capable of conveying both electrical power and communication signals;
    the first connector comprising a plug for insertion into a power sharing socket of a network device and a socket for receiving a plug;
    the second connector comprising a plug for insertion into a power sharing socket of another network device and a socket for receiving another plug, wherein the socket of the first connector is capable of receiving the plug of the second connector, and the socket of the second connector is capable of receiving the plug of the first connector.

12. The power cable of claim 11 wherein the first connector has a hardware logic module to manage communication signals relating to power sharing.

* * * * *